United States Patent [19]

Winters

[11] Patent Number: 4,826,113
[45] Date of Patent: May 2, 1989

[54] PIPE SUPPORT ASSEMBLY

[75] Inventor: Robert E. Winters, Lake Jackson, Tex.

[73] Assignee: The Dow Chemical Company, Midland, Mich.

[21] Appl. No.: 674,435

[22] Filed: Nov. 23, 1984

[51] Int. Cl.$^4$ ............................................. F16C 3/24
[52] U.S. Cl. ..................................... 248/72; 248/228; 248/231.4
[58] Field of Search ................. 248/72, 68.1, 49, 65, 248/70, 73, 74.4, 55, 316.1, 228, 231.4, 73.4, 313

[56] References Cited

U.S. PATENT DOCUMENTS

| | | | |
|---|---|---|---|
| 1,019,447 | 3/1912 | Foerst | 248/231.7 |
| 2,955,790 | 10/1960 | Sylvester | 248/65 |
| 3,053,494 | 9/1962 | Stoll | 248/222 |
| 3,124,330 | 3/1964 | Robinson | 248/72 |
| 3,292,888 | 12/1966 | Fischer | 248/72 |
| 3,298,644 | 1/1967 | Sherburne | 248/55 |
| 3,315,927 | 4/1967 | Malloy et al. | 248/55 |
| 3,472,474 | 10/1969 | Fountain et al. | 248/55 |
| 3,589,659 | 6/1971 | Larkin | 248/316.1 |
| 3,604,676 | 9/1971 | Weber | 248/72 |
| 3,857,643 | 12/1974 | Bardocz | 248/228 |
| 3,963,205 | 6/1976 | Hageman | 248/55 |
| 4,244,543 | 1/1981 | Ericson | 248/55 |
| 4,323,088 | 4/1982 | McClellan | 138/106 |

Primary Examiner—Alvin C. Chin-Shue

[57] ABSTRACT

Pipeline pipe support assembly which allows limited slippage of the pipe support between the supported pipe and the supporting beam to the extent that the part of the pipe in contact with the pipe support becomes exposed for inspection and maintenance purposes.

40 Claims, 9 Drawing Sheets

PIPE SUPPORT ASSEMBLY

This invention relates to supporting pipe of a pipeline on a structural support beam pipe rack with a pipe support disposed between the beam and the pipe.

The pipe support is a novel one in that it can be slid in a manner along the pipe a sufficient distance to allow maintenance work, such as painting, to be performed on the pipe without moving the pipe. In the preferred embodiment of the pipe support, this sliding of the pipe support is accomplished while the pipe support is fixedly attached to the beam of the pipe rack. In an alternative preferred embodiment, part of the pipe support is integrally cast in a single unit from non-rusting organic polymeric materials such as polyurethane. This part is referred to as the end members and base and will be specifically identified below.

BACKGROUND OF THE INVENTION

Pipe supports have long been used with commercial pipelines which are supported on pipe racks. The primary purpose of the pipe support is to prevent the pipe from moving sideways, i.e. laterally to the pipe longitudinal centerline, on the pipe rack, but yet still allow the pipe to move longways, i.e. axially or longitudinally along the pipe's primary axis as the pipe expands and contracts. Such pipe expansion and contraction occurs primarily with temperature changes in the pipe. The axial change in dimensions often amounts to several inches. Thus, if the pipe were rigidly attached to the pipe rack, the longitudinal expansion and contraction of the pipe would cause structural failure or damage to either the pipeline or pipe rack or both. Hence, pipe supports have long been used to allow pipes to move with respect to the pipe rack in the axial direction of the pipe but not in a horizontal lateral direction with respect to the pipe.

Numerous problems with pipe supports have been addressed in the past. For example, see Hageman, D. W., U.S. Pat. No. 3,963,205 (June 15, 1976); Fountain, B. A., U.S. Pat. No. 3,472,474 (Oct. 14, 1969); Ericson, E. A., U.S. Pat. No. 4,244,543 (Jan. 13, 1981); Malloy, J. F., U.S. Pat. No. 3,315,927 (Apr. 25, 1967).

However, there is one problem which has not yet been addressed. That problem is how to perform maintenance, such as painting, on that part of the pipe in contact with the pipe support at any time the maintenance is desired to be done without removing the pipe from the pipe support. Lifting the heavy pipe from the pipe support, of course, requires heavy and expensive equipment. Therefore, it would be advantageous to have a pipe support which allowed maintenance work to be performed on the pipe while the pipe support still supported the pipe and remain attached to the pipe rack support. The present invention achieves these and other advantages.

STATEMENT OF THE INVENTION

The present invention is a pipeline support system. It is comprised of a structural support beam, such as an I, H, or box beam, a pipe, and a slidable pipe support assembly. The beam is part of a pipe rack used to support the pipe. The beam is oriented in a substantially horizontal manner. The pipe resides above the beam and also is oriented in a substantially horizontal manner. The pipe and beam are oriented in a substantially transverse, i.e. perpendicular, manner to each other. Normally, the pipe is connected to many other pipes in a manner so as to form a pipeline.

The slidable pipe support assembly resides between the beam and the pipe in a manner so as to transfer the weight of the pipe and its contents to the beam. This pipe support assembly is comprised of a base and two end members. The two end members are attached in a substantially perpendicular manner to the ends of the base.

Each end member of the preferred pipe support has an upper portion which extends above the top of the base and a lower portion which extends below the bottom of the base. The bottom of the base resides horizontally on the beam with the end members extending in a substantially vertical direction at the ends of the beam. The base of the assembly is longer than the width of the beam's upper surface upon which it resides. This extra length allows the assembly to be slid across the beam while still supporting the pipe. The lower portions of the end members stop the base from being slid so far as to be slid off the beam in all embodiments including the preferred embodiment.

The upper portions of the preferred end members are used to support the pipe. Each of these preferred end members have an indentation in the top of their upper portion. These indentations are shaped and aligned so that the pipe can reside in them and be essentially prevented from moving laterally with respect to the pipe support assembly; but yet these end members indentations are so shaped and so aligned as to allow the pipe to move freely in its axial direction as it expands and contracts.

At any given time the pipe will be residing in the pipe support and will have part of it in contact with the indentations in the end members of the slidable pipe support assembly. Thus if maintenance, such as painting, or only inspection is desired to be carried out on that part of the pipe contacting the pipe support's end members, then the pipe support can be slid axially along the pipe, that is transversely with respect to the beam, until those parts of the pipe no longer contact the pipe. This movement leaves the pipe still being supported by the pipe support at a location on the pipe which is offset than the location which was in contact with the pipe before the pipe support was moved.

To accomplish the above described sliding movement of the slidable pipe support assembly, the base of the pipe support has to be longer, as measured between the lower portions of the end members, than the width of the support beam. Furthermore, the pipe assembly base must be longer than the width of the support beam by an amount which is at least as great as the thickness of the larger of the two end members which support the pipe as measured at the indentations where the end members contact the pipe.

The pipeline support system is enhanced in preventing lateral movement of the pipe if the slidable pipe support assembly has a locking means for securing the pipe support to the structural support beam while still allowing the remainder of the pipe support to be slid a limited amount longitudinally along the pipe's centerline axis and transversely across the structural support beam.

Preferably this locking means of the slidable pipe support assembly is comprised of a pair of guides and a guide tightening means. The simplest guide tightening means is a long bolt fitted with a nut. The guides themselves are made so that each one is slidably fitted in an opening in the end members. Each of these two openings and its respective guides is so shaped so that the pipe support's end members and base can be slid axially in the direction of the pipe but not moved laterally with respect to the pipe in any significant amount. The guide members are also so located in the end members so that part of them extend below the base and are abutted compressively against opposite sides of the beam by the guide tightening means. If the guide tightening means is comprised of a bolt and a nut, then the guides will have enough height to extend upwardly far enough above the top of the beam so that the bolt can be fitted through holes in the guides so as to be situated above the beam. However, the holes in the guides are not so high as to allow the bolt to contact the pipe. The operation of the locking means when it is comprised of a bolt and nut and a pair of guides will better be described below in the discussion of the preferred embodiment of the invention.

Preferably the base is further comprised of at least two spaced ribs which run substantially the whole length of the base and which are located on the bottom side of the base so as to be the part of the base which contacts the top of the beam. The ribs also provide structural integrity to the pipe support, particularly when they are in an integrally formed unit with the base. Further structural integrity is provided when the end members and the base are an integrally formed unit.

Such integrally formed units can be made by forming the unit from a castable metal, a thermosettable plastic material, or a thermoplastic material. One particular useful material is thermosettable polyurethane. It, like most other plastics, provides a material which itself is not corrosive, and, since it is not electrically conductive, it does not allow galvanic corrosion to occur on the pipe or pipe support beam by the electrical connection of dissimilar metals if the pipe and beam are made of dissimilar metals as they are in most instances.

The ribs are also useful in inhibiting corrosion, for the ribs on the bottom of the base provide open spaces between most of the base and the beam so that most of the surface of the beam situated beneath the base can be occasionally washed of corrosive material by rain or manual washing such as is done with hoses. In corrosive environments, particularly corrosive environments where corrosive particulates settle on and between the beam 14 and pipe 10, such washings have been found to be helpful in reducing corrosion of the beam contacting the pipe or pipe support.

An alternate form of the invention is one which does not require either end member to extend upwardly from the base and support the pipe. In this alternate form of the invention, the end members are only required to extend downwardly along the sides of the structural support beam. Another member, the pipe support member, is attached to and extends upwardly from the top of the base to support the pipe. This pipe support member has an indentation in it in which the pipe resides. This pipe support member can be located anywhere along the top side of the base, but preferably it is located near or at the middle of the base. Like the preferred embodiment, this alternative embodiment has dimensional relationships which allow the base, end members and pipe support to be slid along the beam in the axial direction of the pipe a sufficient distance to expose that part of the pipe which was not exposed because it was in contact with the pipe support member. Thus, as with the preferred embodiment, the dimensions of the alternative embodiment must be such that the distance along the base between the end members minus the width of the beam must be at least as great as the thickness of the pipe support member.

Like the preferred embodiment, this alternative embodiment also preferably has a locking guide means which locks itself to the beam and constrains the movement of the pipe support's base, end members, and pipe support member to only the one-dimensional movement in the axial direction of the pipe. In fact, the same locking guide means suitable for the preferred embodiment are suitable for the alternative embodiment. Similarly, it is preferred to form the base, end members, and pipe support member in a one-piece casting. Preferably this casting is made of a thermosettable polyurethane although it too can be made of metal and other plastic material.

BRIEF DESCRIPTION OF THE DRAWING

The invention will be better understood by reference to the drawing wherein the preferred and some alternative embodiments are illustrated, wherein like reference numbers refer to like parts in the several figures, and wherein.

DETAILED DISCUSSION OF PREFERRED EMBODIMENT

Figure 1:
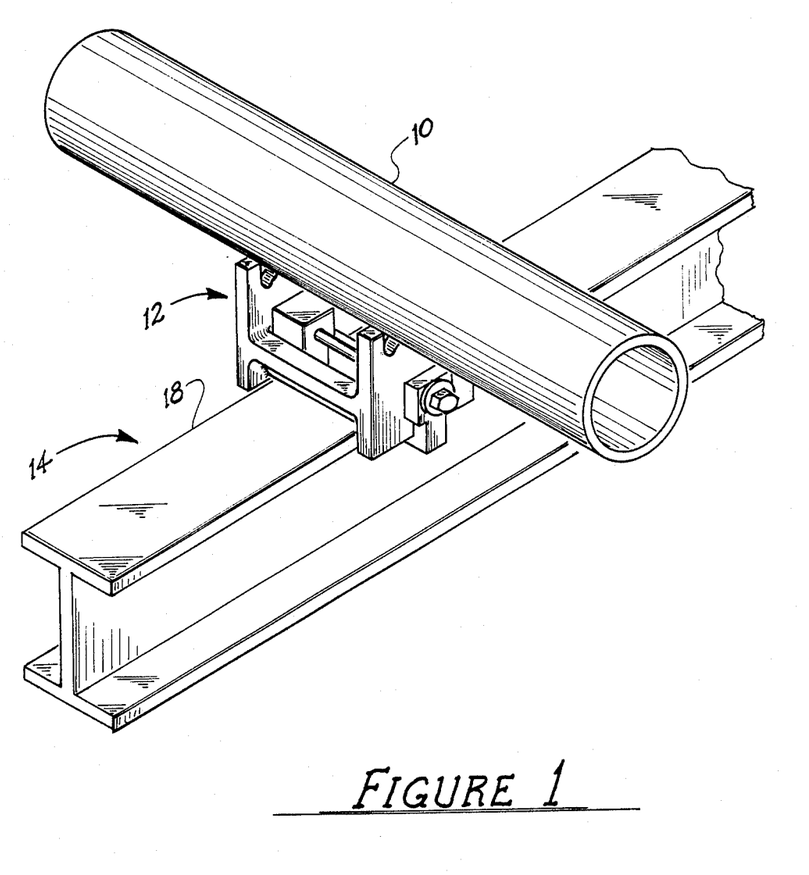
FIG. 1 is a perspective view of the preferred embodiment of the pipeline support system of the invention showing the system's pipe 10, the system's slidable pipe support 12, and its preferred type of structural support beam, I-beam 14.

Referring to FIG. 1, therein is seen a substantially horizontally oriented pipe 10 supported by a pipe support 12 which in turn is supported on the upper surface, i.e. the top flange 18, of substantially horizontally oriented structural I-beam 14. Pipe 10 is part of a pipeline (not shown except for pipe 10) and I-beam 14 is part of a pipe rack (not shown except for I-beam 14). As is the normal case in supporting pipes, pipe 10 is shown oriented perpendicularly to I-beam 14.

Referring to FIGS. 2-14, therein a better appreciation of the invention may be obtained by obtaining a better appreciation of preferred pipe support 12.

Pipe support 12 has a base which is referred to by reference numeral 20 in general references to it and two substantially identical end members. These end members are referred to by reference numerals 22 and 24 in general reference to them. References to specific parts of the base and end members will be by more specific numbers.

Pipe support 12 also is preferably comprised of a locking guide assembly 16 which serves as a locking guide means and which is generally referred to by reference numeral 16. (See FIGS. 4-14, particularly FIG. 4). This locking guide assembly 16 is discussed in detail further below inasmuch as a better appreciation of its function as part of the preferred embodiment of pipe support 12 may be had as a fuller appreciation of the base 20 and the end members 22 and 24 of the preferred pipe support is obtained. In fact, a lesser preferred embodiment of the invention is one in which the pipe support 12 has no locking guide means.

Figure 2:
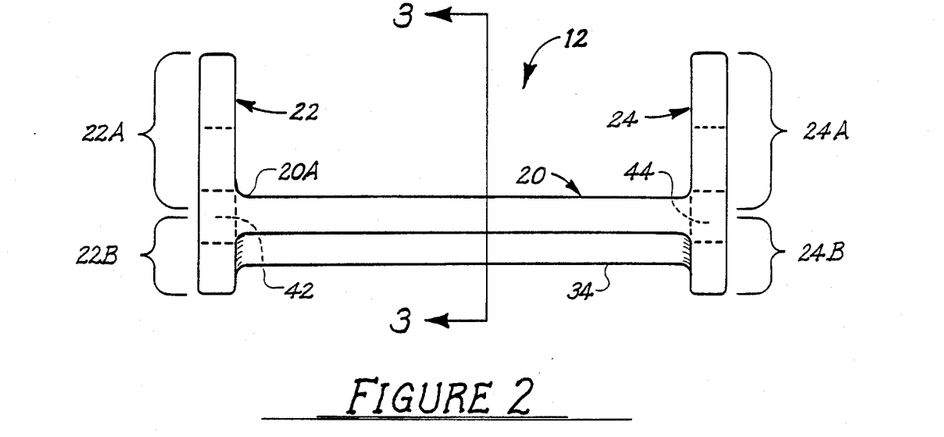
FIG. 2 is a simplified side view of the preferred system's pipe support 12, simplified in that the pipe support's locking guide assembly is now shown.
Figure 2A:
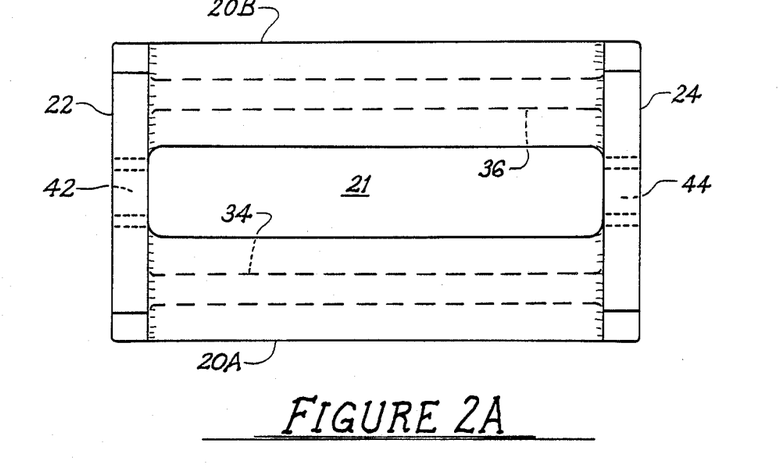
FIG. 2A is a top view of the simplified pipe support 12 of FIG. 2.
Figure 3:
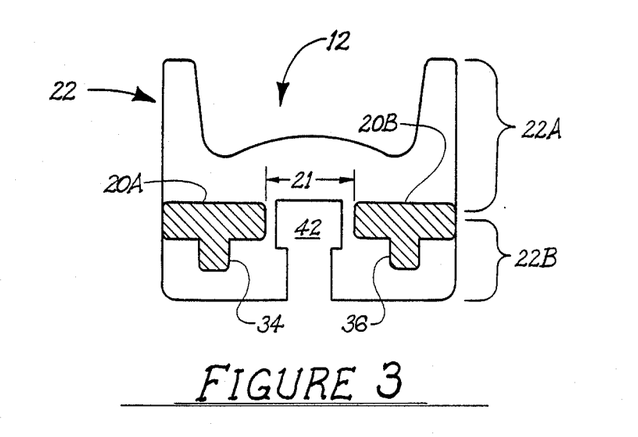
FIG. 3 is a sectional view of the simplified pipe support 12 of FIG. 2 taken along line 3—3 in FIG. 2.

FIGS. 2, 2A and 3 illustrate the preferred embodiment of the pipe support 12 without showing its preferred guide locking assembly 16. Therein base 20 is observed to be comprised of two base members 20A, 20B which are spaced apart by a base channel 21. One purpose for having this channel is to provide a passageway for bolt 28 of the preferred embodiment of the preferred guide assembly 16 (FIGS. 1, 4, 7-14). The provision of a channel at this elevation in pipe support 12 comes about from the optimization of using the least amount of materials in the pipe support, reducing the space needed between pipe 10 and I-beam 14, and providing the maximum structural integrity of pipe support 12. Simultaneously, base channel 21 serves a second purpose; and that is it provides extra guiding structure for guide blocks 30, 32 of the locking guide means 16 shown in FIGS. 1, 4, 7-14, 20. If these advantages are not desired, then base 20 can be a single piece.

In its preferred embodiment, base 20 also has a pair of ribs 34, 36 extending downwardly from it. These ribs 34, 36 are located on the bottom of, and run the length of, base members 20A and 20B as indicated in FIGS. 2-14. These ribs 34, 36 reduce the friction in sliding pipe support 12 across the surface of the I-beam's top flange 18. This sliding feature is an important feature of the invention and is discussed in greater detail below.

Returning now to the elements actually illustrated in FIGS. 2-3, base 20 is seen to be integrally attached to two vertically oriented members 22 and 24. Each end member 22, 24 is figuratively divided, though not literally divided in this preferred embodiment into an upper portion and a lower portion in the region where end members 22, 24 are attached to base 20. End member 22 has an upper portion denoted by reference numeral 22A and a lower portion denoted by reference numeral 22B. (See FIGS. 2 and 3.) End member 24 has an upper portion denoted by reference numeral 24A and a lower portion denoted by reference numeral 24B. The two end members' upper portions 22A and 24A both have a deep indentation in them as the particular places for pipe 10 to reside upon pipe support 12 and to be held in lateral constraint. Of course, the pipe is not restricted in its axial movements as it expands and contracts. Each of the two end members' lower portions 22B, 24B has a notched guide block opening 42, 44, respectively, in it. Guide blocks 30, 32 of locking guide assembly 16 (FIGS. 1, 4, 7-14) are fitted inside openings 42, 44 respectively, when pipe support 12 is fully assembled.

In this preferred embodiment, the end members 22, 24 and base 20 are a single unit formed by a single casting of thermosettable polyurethane.

Figure 4:
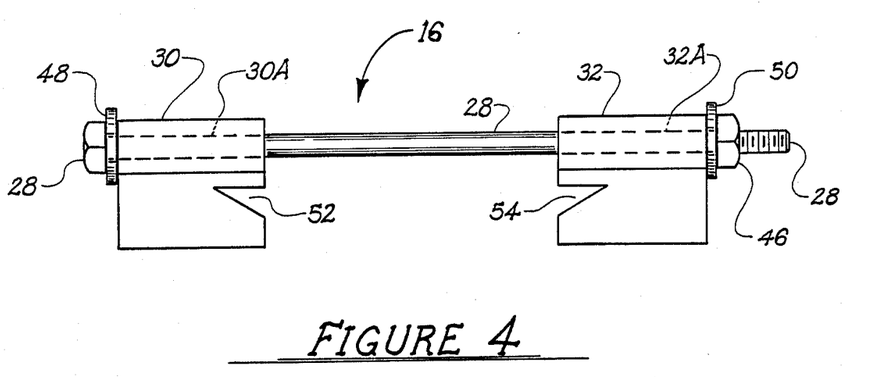
FIG. 4 is a side view of the locking guide assembly 16 missing from the pipe support 12 of FIGS. 2 and 3.

In FIG. 4 there is shown a side view of the preferred locking guide assembly 16 of pipe support 12. Bolt 28 passes loosely through enclosed openings 30A and 32A located, respectively, in guide blocks 30 and 32. The bolt 28 has a nut 46 and two washers 48, 50 mounted on it in order to maintain the guide blocks 30, 32 also mounted upon it, in a clamped position against I-beam flange top 18. (FIGS. 1, 7-14).

Figure 5:
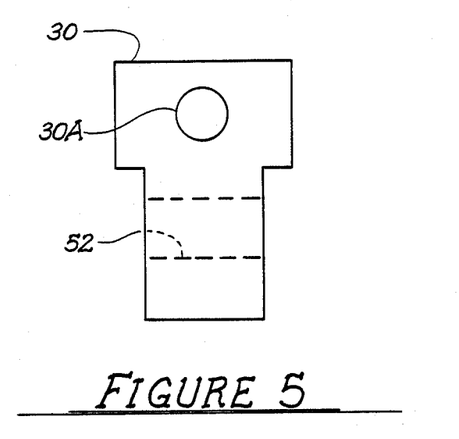
FIG. 5 is an end view of guide block 30 which is one of the guide blocks 30, 32 of the locking guide assembly 16 of FIG. 4.
Figure 6:
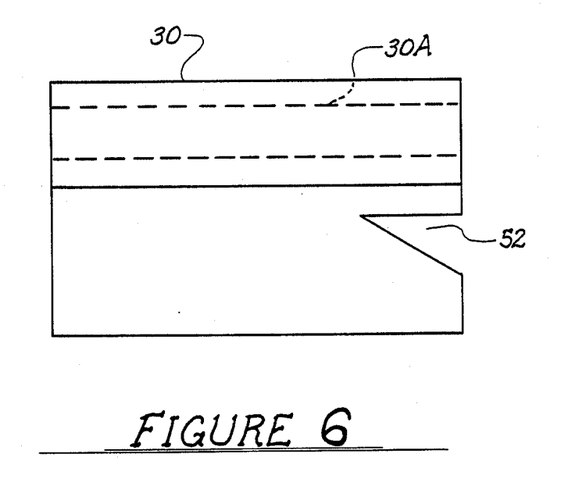
FIG. 6 is a side view of the guide block 30 of FIG. 5.
Figure 7:
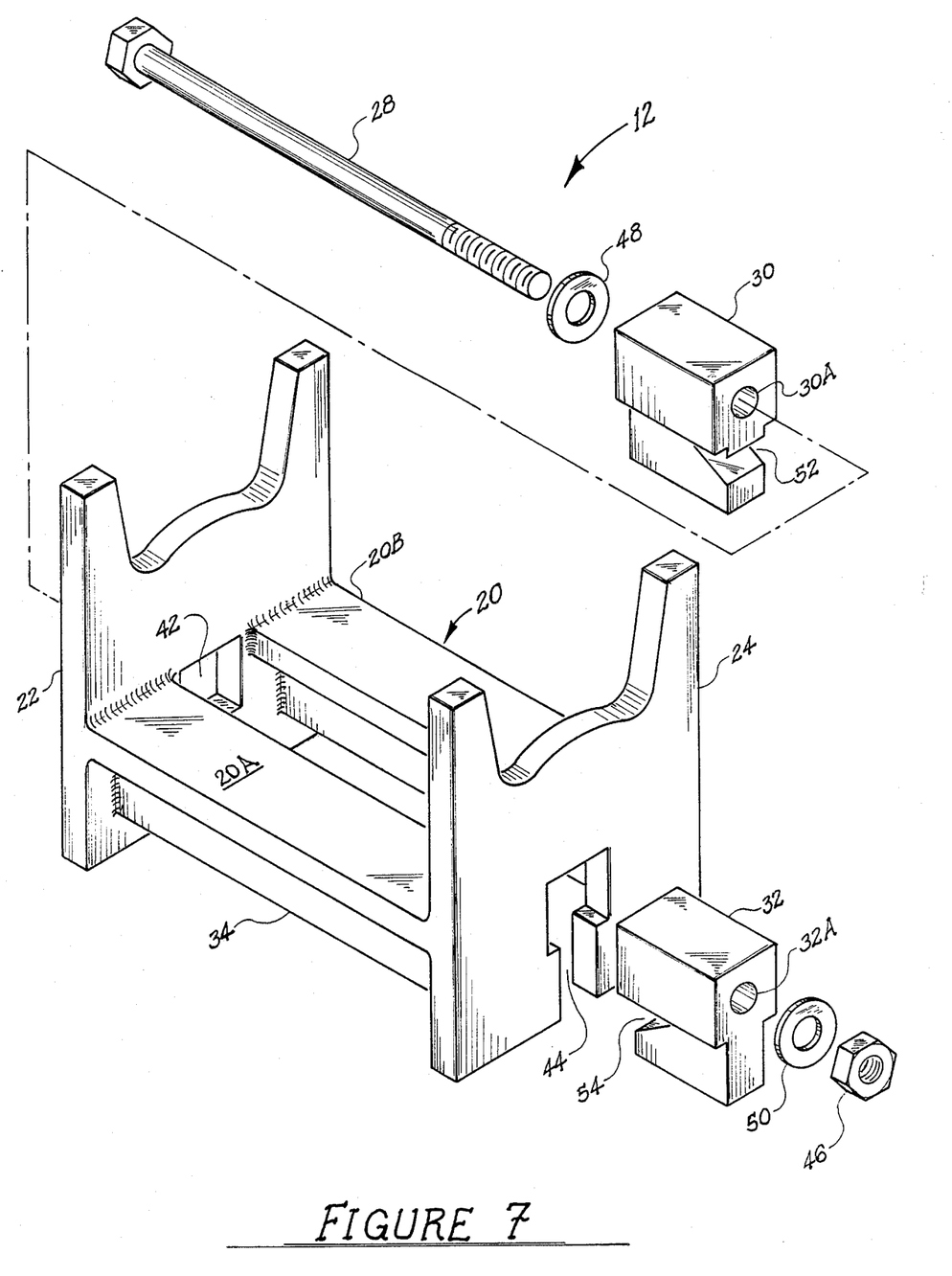
FIG. 7 is an exploded, perspective view of the preferred system's pipe support 12 having its locking guide assembly 16 shown disassembled therewith.
Figure 8:
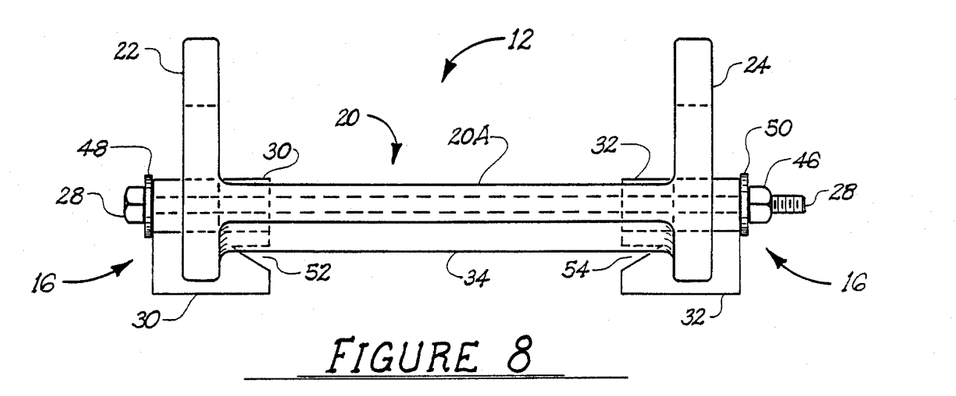
FIG. 8 is a side view of the preferred embodiment of the complete pipe support 12.
Figure 9:
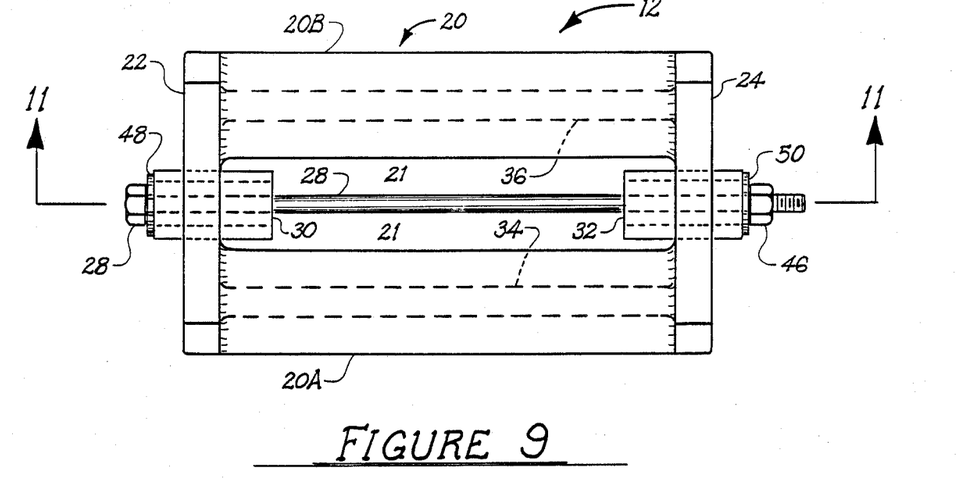
FIG. 9 is a top view of the preferred complete pipe support 12.
Figure 10:
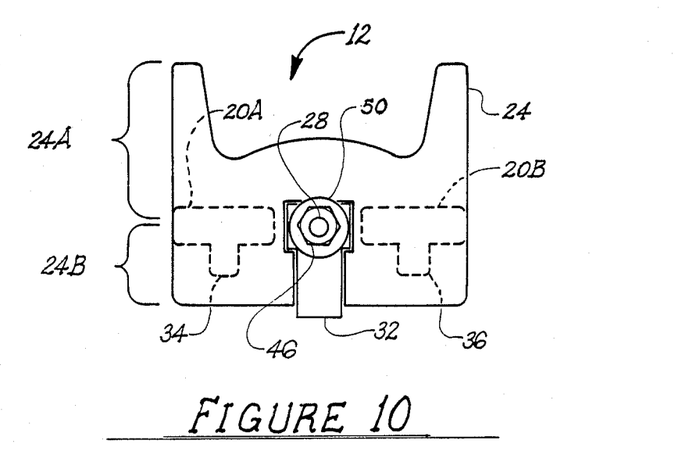
FIG. 10 is an end view of the preferred complete pipe support 12.
Figure 11:
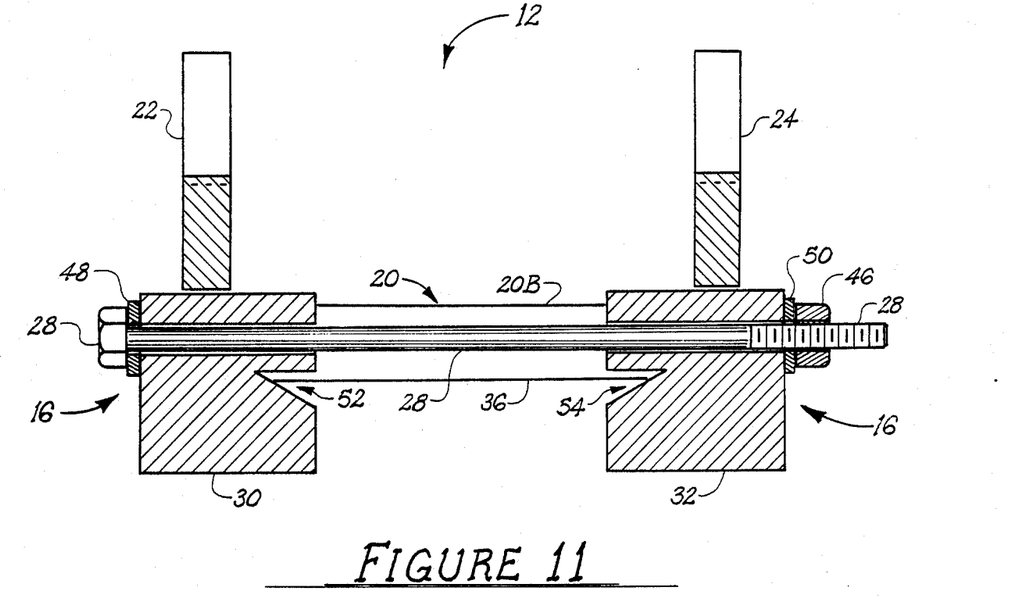
FIG. 11 is a sectional side view of the preferred pipe support 12 as viewed along line 11—11 in FIG. 9.

A better view of how the parts of guide assembly 16 are fitted together, and a good view of how guide means 16 fits into and is a part of pipe support 12, is shown in the exploded, perspective view of pipe support 12 shown in FIG. 7. FIG. 5 and FIG. 6 give two views of guide block 30, one of the preferred two like guide blocks 30, 32. It should be noted that both of these preferred guide blocks 30, 32 have the width of their lower portions smaller than the width of their upper portions in such a manner so as to correspond to the notched guide block openings 42, 44, respectively, formed in the lower portions of end members 22, 24. (Compare the shape of guide 30 as shown in FIG. 5 with the opening 42 in end member 22 as shown in FIG. 3). In having the narrower width of the opening 42 at the lower portion 22B of end member 22 and having the narrower width of guide block 38 at its bottom, then end member 22 can not be separated from guide block 30 by pulling upwardly on pipe support 12 whenever guide block 30 is fitted into opening 42. The same relation exists with opening 44, guide block 32, end member 24 and pipe support 12.

Each guide block 30, 32 is seen to have a slot 52 and 54, respectively, formed in them. This is done in this preferred embodiment so that I-beam flange 18 can be better clamped between, and gripped by, guide blocks 30, 32 of locking guide assembly 16. The location of slots 52, 54 in guide blocks 30, 32, respectively, should be such that no weight of the pipe 10 is transmitted through guide blocks 30, 32 to the top flange 18 of I-beam 14. This pipe weight should be transmitted to flange 18 through the end members' upper portions 22A, 24A and on through base members 20A, 20B and base ribs 34, 36.

Figure 12:
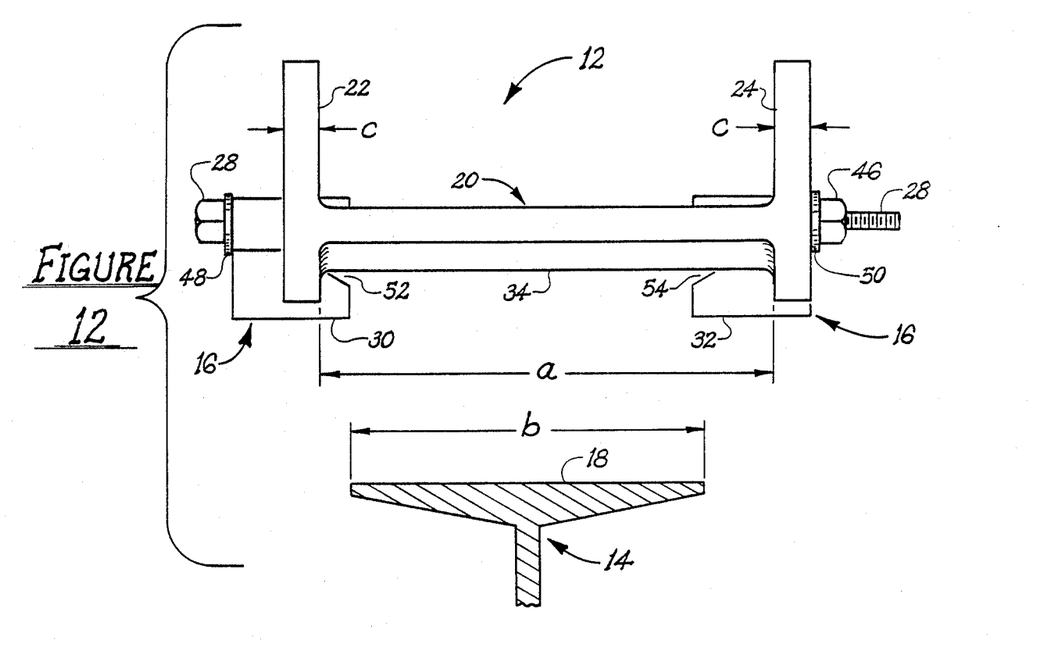
FIG. 12 is a side view of part of the preferred pipeline support system showing the preferred pipe support 12 detached from and elevated above I-beam 14 and showing required dimensional relationships (a, b and c) of relevant parts of pipe support 12 and I-beam 14, said I-beam being shown from an end view as it would be with respect to pipe support 12 in normal usage and further being shown partially broken away and in section.

In order for the invention to operate successfully, there must be a particular relationship between some dimensions of the pipe support 12 and the width of the I-beam's top flange. These dimensions are indicated by the alphabetical letters "a, b and c" in FIG. 12. The letter "a" is the length of the base 20 as measured between the inside of lower portion 22B of end member 22 and the inside of lower portion 24B of end member 24. The letter "b" is the width of the top flange 18 of I-beam 14. The letter "c" is the width of the upper portions of the widest of the end members 22, 24 where they contact pipe 10 (not shown in FIG. 12). Both end members are the same width throughout in this embodiment. The relationship between these three dimensions should be:

$$a - b \geq c$$

With this dimensional relationship, the pipe support 12 can be used as intended.

Figure 13:
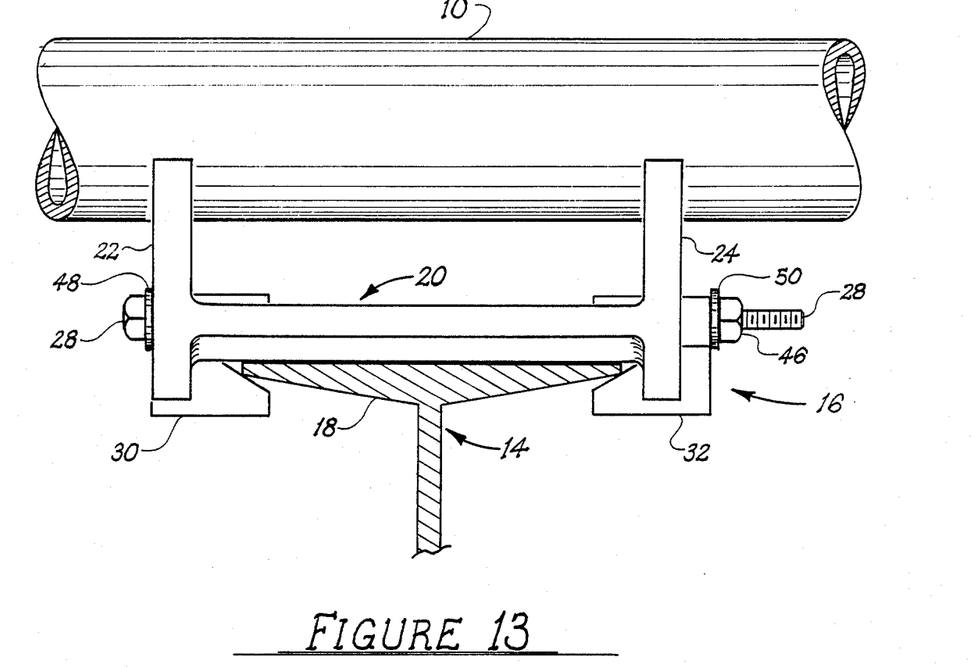
FIG. 13 is a side view of the preferred pipeline support system of the invention, with the body 20 and end members 22, 24 of pipe support 12 slid to the left with respect to pipe 10, I-beam 14, and the guide locking assembly 16 of pipe support 12; (pipe support 12 not being specifically identified by its general reference numeral "12" thereat, but rather being identified by the reference numerals of several of its parts, i.e. 16, 20, 22, 24, 28, 30, 46, 48 and 50)
Figure 14:
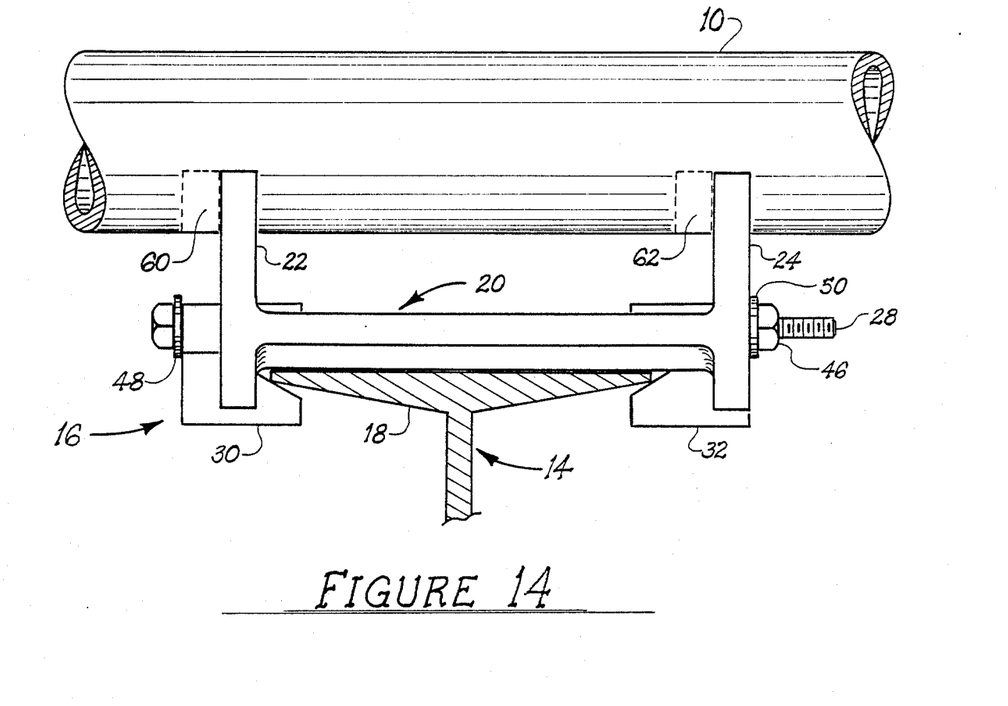
FIG. 14 is a side view of the preferred pipeline support system of the invention, with the body 20 and end members 22, 24 of pipe support 12 slid to the right with respect to pipe 10, I-beam 14, and the guide locking means 16 of pipe support 12; (pipe support 12 not being specifically identified by its general reference number "12" thereat, but rather being identified by the reference numerals of several of its parts, i.e. 16, 20, 22, 24, 28, 30, 32, 46, 48 and 50)

The intended use of the invention is illustrated in FIGS. 13 and 14. Therein pipe support 12 is seen to be clamped onto the top flange 18 of I-beam 14 by its guide blocks 30, 32. Blocks 30, 32 are held securely against I-beam 14 by bolt 28, washers 48 and 50, and nut 46. The edges of top flange 18 of I-beam 14 are securely clamped within the respective slots 52, 54 of guide blocks 30, 32 by tightening nut 46 on bolt 28. In doing this, the locking guide means part of pipe support 12 is rigidly attached to I-beam 14. The remainder of pipe support 12 is not so rigidly attached, however, for base 20 and end members 22, 24 must be free to slide in the axial direction of pipe 10 when end members 22, 24 have the respective guide blocks 30, 32 fitted into their corresponding guide openings 42, 44 as shown in FIGS. 1, 8-11, 13, 14.

Thus with pipe support 12 secured to I-beam 14 as described above, then the base 20 and end members 22, 24 of pipe support 12 are free to move a limited amount in the axial direction of pipe 10. This is true even when pipe 10 is filled with a heavy liquid. Sometimes it is helpful to move the integrally formed base 20 and end members 22, 24 with a hammer when the friction between pipe 10, pipe support 12, and I-beam 14 is increased such as occurs when pipe 10 is filled with liquid.

The above described dimensional constraints, $a - b \geq c$, is predicated upon several physical considerations. First, it is desired to be able to slide base 20 and end members 22, 24 along the axial direction of the pipe, but not to slide them so far as to be able to slide them off I-beam 14. Hence, the lower portions 22B, 24B of end members 22, 24, respectively, prevent this undesired, unrestrained movement of base 20 and end members 22, 24. Thus, dimension "a" must be greater than dimension "b" in FIG. 14. How much greater leads to the discussion of the next consideration of these dimensions. In FIG. 13, base 20 and end members 22, 23 are seen pushed to the left with respect to pipe 10, I-beam 14, and guide blocks 30, 32. The lower portion 24B of end member 24 abuts against I-beam flange 18 and prevents further movement to the left of base 20 and end members 22, 24. In FIG. 13 it should be recognized that the two parts of pipe 10 which are cradled in the indentations in each end member upper portion 22A, 24A would normally be inaccessible for inspection and maintenance. However, as seen in FIG. 14 these normally inaccessible pipe parts, identified by numbers 60 and 62, are made accessible by sliding the base 20 and members 22 and 23 to the far right with respect to pipe 10, I-beam 14, and guide blocks 30 and 32. In this instance, base 20 and end members 22, 24 are restrained from being pushed further to the right by the abutting of the lower portion 22B of end member 22 against the left side of I-beam flange 18. In this position of the invention, the formerly inaccessible pipe parts 60, 62 become inaccessible. Of course, the width of pipe parts 60, 62 is the same as the width of the upper portions 22A, 24A of end members 22, 24; that is their width has the dimensions "c" also. Thus, if pipe support 12 is made such that the dimensional relationship of "$a - b \geq c$" is true, then the would-be inaccessible pipe parts 60, 62 become accessible, and they become accessible without risk of pipe support 12 inadvertently being pushed from its position between pipe 10 and I-beam 14 due to the restraining action of the lower portions of end members 22, 24.

In FIGS. 15-18, there are shown alternative embodiments to the shapes of above described preferred guide blocks 30, 32 along with alternative end members whose guide block openings are adapted to fit these alternative embodiments of the preferred guide blocks.

Figure 15:
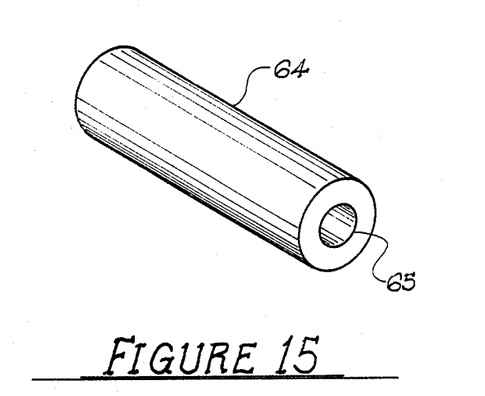
FIG. 15 is a perspective view of an alternative cylindrical-shaped guide block numbered 64.
Figure 16:
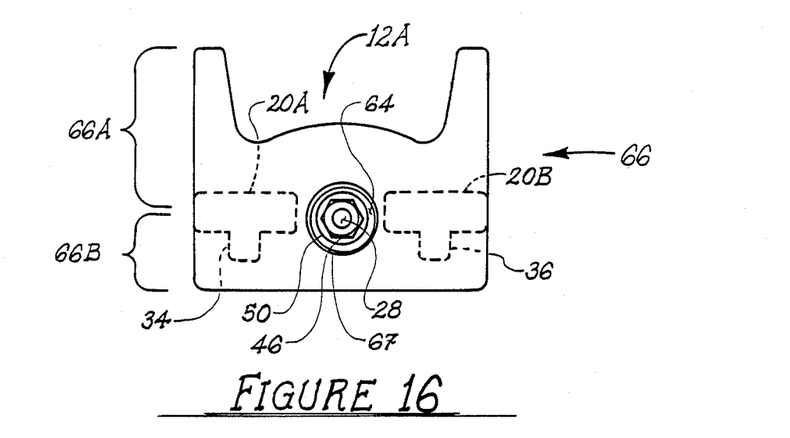
FIG. 16 is an end view of an alternative embodiment of a pipe support 12A for the pipe line support system, said pipe support being adapted to use the cylindrical-shaped guide block 64 of FIG. 15.

In FIG. 15 there is shown alternative guide block 64 which is cylindrical in cross-sectional shape. It has an enclosed opening 65 through it for the passage of bolt 28. In FIG. 16 alternative end member 66 has an enclosed guide block opening 67. This opening 67 is adapted to fit around cylindrical guide block 64 and prevent it from moving in any direction except one parallel to the longitudinal axis of the guide block 64. Note that the cylindrical opening's boundaries guide block 64 in FIG. 16, and they are hard to distinguish without a further drawing figure. A further drawing figure is deemed not to be needed to make this distinction.

Figure 17:
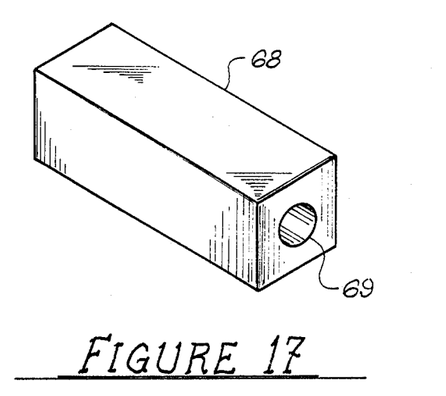
FIG. 17 is a perspective view of an alternative embodiment of guide block numbered 68.
Figure 18:
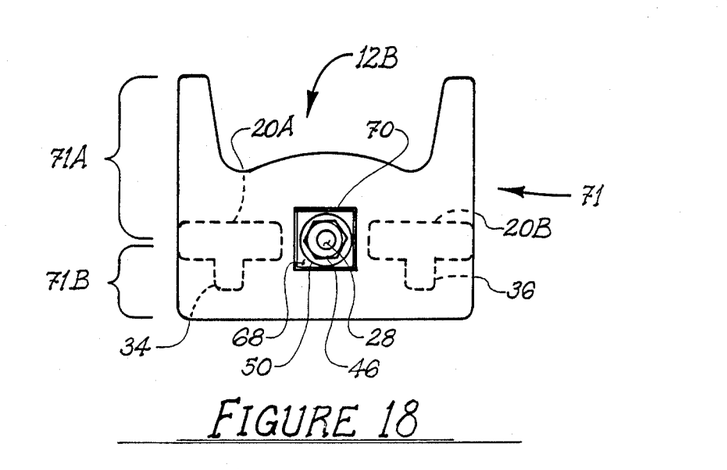
FIG. 18 is an end view of a pipe support 12 modified to accommodate the alternative guide block 68 of FIG. 17.

FIG. 17 shows an alternative guide block 68 which has a square cross-sectional shape. It too has an enclosed opening 69 for passage of bolt 28 therethrough. In FIG. 17, square guide block 68 is shown fitted in side enclosed guide square opening 70 which is positioned within alternative end member 71. Opening 70 is shaped to as to limit the movement of guide block 68 in every direction except the direction along the longitudinal axis of square guide block 68. Note the boundaries of opening 70 coincide with the external boundaries of guide block 68 in FIG. 18.

As may be appreciated, many other guide block shapes may be utilized without limiting the scope of the invention. Similarly, many different corresponding shapes of end members may also be used.

Furthermore, the invention is not limited to the I-beam type of structural beam which supports the preferred pipe support 12. This non-limitation is illustrated in FIG. 19 wherein the preferred embodiment of the pipe support 12 is secured upon a rectangular shaped wooden beam 72 instead of upon an I-beam.

Figure 19:
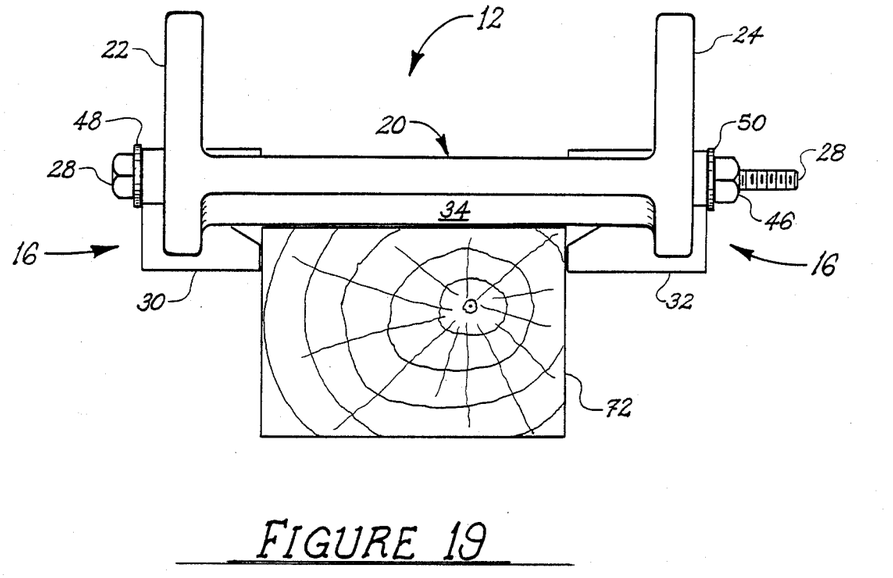
FIG. 19 is a side view of another embodiment of the invention wherein the I-beam is replaced with a wooden beam 72 having rectangular cross-section.

In the embodiment of FIG. 19 another alternative is apparent, and that is guide blocks 30, 32, do not need slots 52 and 54 to be effective with the structural beam used in the invention. I-beams are merely the usual preformed beams.

Figure 20:
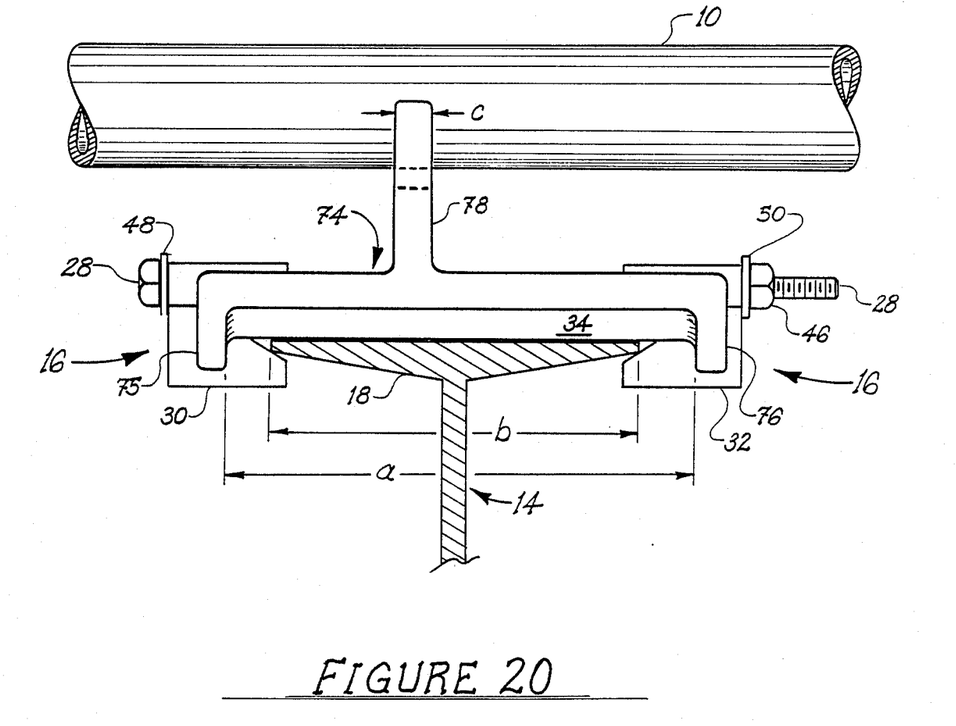
FIG. 20 is a side view of an alternative embodiment of the pipe support of the invention which is numbered assigned general reference number 74 as a general reference number and wherein the upper parts of the two end members 22A, 24A of the preferred embodiment of pipe support 12 (see FIGS. 3, 10) are replaced with a single upper pipe support member 78.

FIG. 20 illustrates another embodiment of the invention. It is like the preferred embodiment except that the alternative pipe support 74 does not have end members with upper portions which support pipe 10. It still has end members, however, but they do not support pipe 10. They could also be extended upwardly so as to have three supports for pipe 10, but they are not here. Instead end members 75, 76 are used only as stops to prevent base 20 from sliding off structural beam 14 and for providing guide openings (not visible) for guide blocks 30, 32. These openings work like the openings 30A, 32A work in the embodiment of FIGS. 1, 7-14, or like openings 69 works in the embodiment illustrated in FIG. 16, or like the opening 70 works in the embodiment illustrated in FIG. 18. As seen, pipe 10 is supported by one pipe support member 78 located substantially somewhere in the middle section of base 20 between the ends of base 20. Guide block assembly 16 is the same as that in the preferred embodiment described above as is the base 20 in this alternative slidable pipe support assembly 74.

I claim:

1. A pipeline support system comprised of a slidable pipe support assembly interposed between a substantially horizontally oriented pipe and a substantially horizontally oriented structural support beam, said pipe's lengthwise dimension being substantially perpendicular to said beam's lengthwise dimension, said pipe being disposed on top of said pipe support, said beam being disposed beneath said pipe support, said beam having a substantially flat upper surface which is in abutting contact with the pipe support;

said slidable pipe support assembly being comprised of a base and two end members, said two members being attached substantially perpendicularly to the ends of said base in a manner such that each end member has an upper portion which extends above and a lower portion which extends below the base on opposite sides of the structural support beam, the bottom of said base residing on and being in slidable contact with the upper surface of said beam;

each of said two end members having an indentation in its present upper portion in which said pipe resides in a manner such that the pipe can freely expand and contract in the axial direction of the pipe;

said base being sufficiently long so that said lower portions of the two end members extend downwardly past the bottom of the base in order that the weight of the pipe is not transferred from the upper portion of each end member to the beam through said lower portions but rather is transferred from the upper portion of each end member to the beam through said base;

said base also being long enough in the axial direction of the pipe so that the sum of the distances from the beam to the two end members is at least as great as the thickness of either of the two end members at the location where the end members contact the pipe in order that the pipe support can be manually slid a sufficient distance in the longitudinal direction of the pipe whereby that part of the pipe which had been contacting the indentations in the upper portions of the end members of the pipe support would no longer be contacting the pipe support and, therefore, would be exposed so that pipe maintenance work could be performed while the pipe is still supported on the beam by the pipe support; and the portions of the end members extending below the base serving as stops to prevent the base, and thus the pipe support, from sliding off the beam.

2. The pipeline support system of claim 1 wherein the slidable pipe support assembly is further comprised of a locking means for securing the pipe support to the beam while still allowing the pipe support to be slid a limited amount longitudinally along the pipe and transversally across the beam.

3. The pipeline support system of claim 2 wherein the locking means of the slidable pipe support assembly is comprised of a pair of guide blocks and a guide tightening bolt and nut, one of said guide blocks being slidably fitted in a guide opening in one of the two end members of the pipe support and the other of said guide blocks being fitted in a guide opening of the other end member; said guide blocks and guide openings being made so that there can be easy sliding movement of the guides through the opening in a direction which is parallel to the length of the pipe;

each of said guide blocks also having a hole in it through which passes said bolt, said guides being tightened together with the bolt and nut so that the guides are engaged by a compressive force against the opposing edges of the beam, said force being sufficient to prevent any substantial movement between the guide blocks and the beam, said guide blocks being sufficiently long enough so that when they are compressively engaged against the beam they will be slidably fitted in their support base and end members are manually slid across the top of the beam in a direction parallel to the length of the pipe to the extent permitted by the stoppage action which occurs when either one of the end members' lower portion abuts against the beam, said openings in said end members and said holes in said guides being co-ordinated in a manner such that the bolt is disposed above the beam and below the pipe.

4. The pipeline support system of claim 3 wherein the base of the slidable pipe support assembly is further comprised of at least two ribs which run substantially the whole length of the base and which are so spaced apart on the base's bottom side as to be the part of the base which slidably contacts the top of the beam as well as providing structural strength to the pipe support.

5. The pipeline support system of claim 1 wherein the base and two end members are a single, integrally formed unit.

6. The pipeline support system of claim 4 wherein the base and two end members are a single, integrally formed unit.

7. The pipeline support system of claim 5 wherein the integrally formed unit is made from a thermosettable material or a thermoplastic material.

8. The pipeline support system of claim 6 wherein the integrally formed unit is made from a thermosettable material or a thermoplastic material.

9. The pipeline support system of the claim 7 wherein the integrally formed unit is made of a rigid polyurethane.

10. The pipeline support system of claim 6 wherein the integrally formed unit is made of a rigid polyurethane.

11. The pipeline support system of claim 1 wherein the base and two end members are made of a metallic structural material.

12. The pipeline support system of claim 4 wherein the base and two end members are made of a metallic structural material.

13. The pipeline support system of claim 5 wherein the base and two end members are made of a metallic structural material.

14. The pipeline support system of claim 6 wherein the base and two end members are made of a metallic structural material.

15. A pipeline support system comprised of a slidable pipe support assembly interposed between a substantially horizontally oriented pipe and a substantially horizontally oriented structural support beam, said pipe's lengthwise dimension being substantially perpendicular to said beam's lengthwise dimensions, said pipe being disposed on top of said pipe support, said beam being disposed beneath said pipe support, said beam having a substantially flat upper surface which is in abutting contact with the pipe support;

said slidable pipe support assembly being comprised of a base, two end members, and a pipe support member;

said two end members being attached substantially perpendicularly to the ends of said base in a manner such that each end member extends at least below the base on opposite sides of the structural support beam and each end member extends far enough down the sides of the structural support beam to act as stops for the base and thereby prevent the base from sliding off the sides of the beam;

said pipe support member being attached to and extending upwardly from said base;

said pipe support member of said pipe support assembly also having an indentation present in its upper portion in which said pipe resides and resides in a manner such that the pipe can freely expand and contract in the axial direction of said pipe;

said base being sufficiently long, base length being defined as the base dimensions parallel to the axial direction of the pipe, so that the distance between the two downwardly extending end members minus the width of the support beam is at least as great as the thickness of the pipe support member where it contacts the pipe in order that the base, two end members, and pipe support members of the pipe support assembly can be slid transversely across the support beam and axially along the pipe a sufficient distance so that all of that part of the pipe which was in contact with the pipe support member can be exposed for pipe maintenance work.

16. The pipeline support system of claim 15 wherein the slidable pipe support assembly is further comprised of a locking means for securing the pipe support to the beam while still allowing the pipe support to be slid a limited amount longitudinally along the pipe and transversally across the beam.

17. The pipeline support system of claim 16 wherein the locking means of the slidable pipe support assembly is comprised of a pair of guide blocks and a guide tightening bolt and nut, one of said guide blocks being slidably fitted in a guide opening in one of the two end members of the pipe support and the other of said guide blocks being fitted in a guide opening of the other end member; said guide blocks and guide openings being made so that there can be easy sliding movement of the guides through the opening in a direction which is parallel to the length of the pipe;

each of said guide blocks also having a hole in it through which passes said bolt, said guides being tightened together with the bolt and nut so that the guides are engaged by a compressive force against the opposing edges of the beam, which force is sufficient to prevent any substantial movement between the guide blocks and the beam, said guide blocks being sufficiently long enough so that when they are compressively engaged against the beam they will be slidably fitted in their respective end member guide openings even when the pipe support base and end members are manually slid across the top of the beam in a direction parallel to the length of the pipe to the extent permitted by the stoppage action which occurs when either one of the end members abuts against the beam, said openings in said end members and said holes in said guides being coordinated in a manner such that the bolt is disposed above the beam and below the pipe.

18. The pipeline support system of claim 17 wherein the base of the slidable pipe support assembly is further comprised of at least two ribs which run substantially the whole length of the base and which are so spaced apart on the base's bottom side as to be the part of the base which slidably contacts the top of the beam's upper flange as well as providing structural strength to the pipe support.

19. The pipeline support system of claim 15 wherein the base and two end members are a single, integrally formed unit.

20. The pipeline support system of claim 19 wherein the integrally formed unit is made from a thermosettable material or a thermoplastic material.

21. A slidable pipe support assembly adapted for use in a pipeline support system, with said pipeline support system being comprised of the slidable pipe support assembly, a substantially horizontally oriented pipe and a substantially horizontally oriented structural support beam, and with said slidable pipe support assembly being adapted for being interposed between said pipe and said beam, and with said pipe's lengthwise dimension being substantially perpendicular to said beam's lengthwise dimension, and with said pipe being disposed on top of said pipe support, and with said beam being disposed beneath said pipe support, and with said beam having a substantially flat upper surface which is in abutting contact with the pipe support;

said slidable pipe support assembly being comprised of a base and two end members;

said two members being attached substantially perpendicularly to the ends of said base in a manner such that each end member has an upper portion which would extend above and a lower portion which would extend below the base on opposite sides of the structural support beam, the bottom of said base being adapted to reside on and be in slidable contact with the upper surface of said beam when said slidable pipe support assembly is interposed between said pipe and said structural support beam;

each of said two end members having an indentation in its present upper portion in which said pipe can reside in a manner such that the pipe could freely expand and contract in the axial direction of the pipe when said slidable pipe support assembly is interposed between said pipe and said structural support beam;

said base being sufficiently long so that said lower portions of the two end members can extend downwardly past the bottom of the base in order that the weight of the pipe would not be transferred from the upper portion of each end member to the beam through said lower portion but rather would be transferred from the upper portion of each end member to the beam through said base when the pipe support is residing on the beam and said pipe is residing on the pipe support;

said base also being long enough in the axial direction of the pipe it is adapted to support so that the sum of the distances from the beam to the two end members is at least as great as the thickness of either of the two end members at the location where the end members would contact the pipe in order that the pipe support could be manually slid a sufficient distance in the longitudinal direction of the pipe whereby that part of the pipe which would have been contacting the indentations in the upper portions of the end members of the pipe support if the pipe were adaptively positioned in the pipe support would no longer be contacting the pipe support and, therefore, could be exposed so that pipe maintenance work could be performed while the pipe was still being supported on the beam by the pipe support when the slidable pipe support assembly is interposed between said pipe and said structural beam; and the portions of the end members extending below the base serving as stops to prevent the base, and thus the pipe support, from sliding off the beam when the pipe support was in position between the pipe and the beam.

22. The slidable pipe support assembly of claim 21 which is further comprised of a locking means for securing the pipe support to the beam for which it is adapted to be used while still allowing the pipe support to be slid a limited amount transversally across the beam and longitudinally along the pipe for which it was adapted to be used, when said slidable pipe support assembly is interposed between said beam and said pipe.

23. The slidable pipe support assembly of claim 22 wherein the locking means is comprised of a pair of guide blocks and a guide tightening bolt and nut, one of said guide blocks being slidably fitted in a guide opening in one of the two end members of the pipe support and the other of said guide blocks being fitted in a guide opening of the other end member; said guide blocks and guide openings being made so that there can be easy sliding movement of the guides through the opening in a direction which is parallel to the axial length of the pipe, when said slidable pipe support assembly is interposed between said beam and said pipe;

each of said guide blocks also having a hole in it through which passes said bolt, said guides being tightened together with the bolt and nut so that the guides are capable of being engaged by a compressive force against the opposing edges of the beam, said force being sufficient to prevent any substantial movement between the guide blocks and the beam, said guide blocks being sufficiently long enough so that when they are compressively engaged against the beam they will be slidably fitted in their respective end member guide openings even when the pipe support base and end members are manually slid across the top of the beam in a direction parallel to the length of the pipe to the extent permitted by the stoppage action which occurs when either one of the end members' lower portion abuts against the beam, said openings in said end members and said holes in said guides being co-ordinated in a manner such that the bolt is disposed above the beam and below the pipe when said slidable pipe support assembly is interposed between said pipe and said beam.

24. The slidable pipe support assembly of claim 23 wherein the base is further comprised of at least two ribs which run substantially the whole length of the base and which are so spaced apart on the base's bottom side as to be the part of the base which slidably contacts the top of the beam as well as providing structural strength to the pipe support when said slidable pipe support assembly is interposed between said pipe and said beam.

25. The slidable pipe support assembly of claim 21 wherein the base and two end members are a single, integrally formed unit.

26. The slidable pipe support assembly of claim 24 wherein the base and two end members are a single, integrally formed unit.

27. The slidable pipe support assembly of claim 25 wherein the integrally formed unit is made from a thermosettable material or a thermoplastic material.

28. The slidable pipe support assembly of claim 26 wherein the integrally formed unit is made from a thermosettable material or a thermoplastic material.

29. The slidable pipe support assembly of claim 27 wherein the integrally formed unit is made of a rigid polyurethane.

30. The slidable pipe support assembly of claim 26 wherein the integrally formed unit is made of a rigid polyurethane.

31. The slidable pipe support assembly of claim 21 wherein the base and two end members are made of a metallic structural material.

32. The slidable pipe support assembly of claim 24 wherein the base and two end members are made of a metallic structural material.

33. The slidable pipe support assembly of claim 25 wherein the base and two end members are made of a metallic structural material.

34. The slidable pipe support assembly of claim 26 wherein the base and two end members are made of a metallic structural material.

35. A slidable pipe support assembly capable of being interposed between a substantially horizontally oriented pipe and a substantially horizontally oriented structural support beam in such a fashion so that said pipe's lengthwise dimension can be substantially perpendicular to said beam's lengthwise dimension, and so that said pipe can be disposed on top of said pipe support with said beam being disposed beneath said pipe support;

said slidable pipe support assembly being comprised of a base, two end members, and a pipe support member;

said two end members being capable of being attached substantially perpendicularly to the ends of said base in a manner such that each end member extends at least below the base on opposite sides of the structural support beam and each end member extends far enough down the sides of the structural support beam to act as stops for the base and thereby prevent the base from sliding off either side of the beam;

said pipe support member being attached to the base and extending upwardly from said base;

said pipe support member of said pipe support assembly also having an indentation present in its upper portion in which said pipe is capable of residing and is capable of residing in a manner such that the pipe can freely expand and contract in the axial direction of said pipe;

said base being sufficiently long, base length being defined as the base dimension parallel to the axial direction of the pipe, so that the distance between the two downwardly extending end members minus the width of the support beam is at least as great at the thickness of the pipe support member where it contacts the pipe in order that the base, two end members, and pipe support members of the pipe support assembly can be slid transversely across the support beam and axially along the pipe a sufficient distance so that all of that part of the pipe which was in contact with the pipe support member can be exposed for pipe maintenance work when said slidable pipe support assembly is suitably interposed between said pipe and said beam.

36. The slidable pipe support assembly of claim 35 which is further comprised of a locking means for securing the pipe support to the beam while still allowing the pipe support to be slid a limited amount longitudinally along the pipe and transversely across the beam.

37. The slidable pipe support assembly of claim 36 wherein the locking means of the slidable pipe support assembly is comprised of a pair of guide blocks and a guide tightening bolt and nut, one of said guide blocks being slidably fitted in a guide opening in one of the two end members of the pipe support and the other of said guide blocks being fitted in a guide opening of the other end member; said guide blocks and guide openings being made so that there can be easy sliding movement of the guides through the opening in a direction which is parallel to the length of the pipe when the slidable pipe support assembly is interposed between the pipe and beam;

each of said guide blocks also having a hole in it through which passes said bolt, said guides being tightened together with the bolt and nut so that the guides are capable of being engaged by a compressive force against the opposing edges of the beam, which force is sufficient to prevent any substantial movement between the guide blocks and the beam, said guide blocks being sufficiently long enough so that when they are compressively engaged against the beam they will be slidably fitted in their respective end member guide openings even when the pipe support base and end members are manually slid across the top of the beam in a direction parallel to the length of the pipe to the extent permitted by the stoppage action which occurs when either one of the end members abuts against the beam, said openings in said end members and said holes in said guides being co-ordinated in a manner such that the bolt is disposed above the beam and below the pipe when the slidable pipe support assembly is interposed between the beam and the pipe.

38. The slidable pipe support assembly of claim 37 wherein the base is further comprised of at least two ribs which run substantially the whole length of the base and which are so spaced apart on the base's bottom side as to be the part of the base which will slidably contact the top of the beam's upper flange as well as providing structural strength to the pipe support when the slidable pipe support/assembly is interposed between the pipe and the beam.

39. The slidable pipe support assembly of claim 35 wherein the base and two end members are a single, integrally formed unit.

40. The slidable pipe support assembly of claim 39 wherein the integrally formed unit is made from a thermosettable material or a thermoplastic material.

* * * * *

UNITED STATES PATENT AND TRADEMARK OFFICE
CERTIFICATE OF CORRECTION

PATENT NO. : 4,826,113

DATED : May 2, 1989

INVENTOR(S) : Robert E. Winters

It is certified that error appears in the above-identified patent and that said Letters Patent is hereby corrected as shown below:

Col. 5, line 28; delete "numbered".

Col. 5, line 54; change "reference" to --references--.

Col. 8, line 56; insert --coincide with the peripheral boundaries of cylindrical-- before "guide".

Col. 8, line 64; change "in side" to --inside--.

Col. 10, line 50, Claim 3; insert --respective end member guide openings even when the pipe-- before "support".

Col. 11, line 58, Claim 15; change "dimensions" to --dimension--.

Col. 13, line 24, Claim 21; change "portion" to --portions--.

Signed and Sealed this

Twenty-ninth Day of May, 1990

*Attest:*

HARRY F. MANBECK, JR.

*Attesting Officer*  *Commissioner of Patents and Trademarks*